(12) United States Patent
Nagase et al.

(10) Patent No.: US 7,885,720 B2
(45) Date of Patent: Feb. 8, 2011

(54) DECODER FOR FAST FEED AND REWIND

(75) Inventors: Masaru Nagase, Tokyo (JP); Hirofumi Muramatsu, Tokyo (JP)

(73) Assignee: Oki Semiconductor Co., Ltd. (JP)

( * ) Notice: Subject to any disclaimer, the term of this patent is extended or adjusted under 35 U.S.C. 154(b) by 980 days.

(21) Appl. No.: 11/730,624

(22) Filed: Apr. 3, 2007

(65) Prior Publication Data

US 2007/0230897 A1    Oct. 4, 2007

(30) Foreign Application Priority Data

Apr. 4, 2006   (JP) .............................. 2006-103423

(51) Int. Cl.
*G06F 17/00*   (2006.01)
(52) U.S. Cl. ....................................................... 700/94
(58) Field of Classification Search ................... 700/94; 381/61; 369/1–12; 704/500–504
See application file for complete search history.

(56) References Cited

U.S. PATENT DOCUMENTS

2005/0147004 A1    7/2005   Kumagai et al.

FOREIGN PATENT DOCUMENTS

JP    2002-335230    11/2002

*Primary Examiner*—Andrew C Flanders
(74) *Attorney, Agent, or Firm*—Studebaker & Brackett PC; Donald R. Studebaker

(57) ABSTRACT

The decoder includes a memory to store the jump time for a seek operation. The decoder affords frame numbers to the frames and saves in the memory the current frame number of a frame being read out. The decoder saves a frame number of a jump destination calculated on the basis of the current frame number and the jump time as read out from the memory. The decoder reverts to the header on a seek operation accepted, and affords provisional frame numbers to the frames. The decoder further decodes the compressed data from the frame following the frame the provisional frame number of which coincides with the frame number of the jump destination, in fast feed, or from the frame following the frame the provisional frame number of which coincides with a frame number by one before the frame number of jump destination, in rewind.

6 Claims, 4 Drawing Sheets

DECODER FOR FAST FEED AND REWIND

BACKGROUND OF THE INVENTION

1. Field of the Invention

The present invention relates to a decoder for decoding compressed audio data obtained through encoding audio data such as music data.

2. Description of the Background Art

Recently, memory cards are increasing in capacity, while hard disks of larger capacities are being reduced in size. There is an increasing demand for a portable audio player enclosing therein a recording medium, such as semiconductor storage cards or magnetic recording disks, on which there may be recorded encoded audio data, such as music data. An encoder system as MP3 (MPEG 2 (Moving Picture Experts Group) Audio Layer 3) or MPEG2/AAC (Advanced Audio Coding) has been standardized as a technique for encoding audio data.

With the AAC encoding system, audio data are divided into temporal units and the audio data of each temporal unit are encoded for compression in accordance with the PCM (Pulse Code Modulation) system. The temporal unit corresponds to a unit time of the PCM data decoded from compressed, encoded audio data. The unit time of PCM data is recorded in the form of frame. In decoding, each frame of compressed audio data is decoded as a unit, and the PCM data thus obtained through decoding on the frame basis is reproduced continuously.

The compressed audio data obtained through encoding are decoded by a conventional decoder, in which the compressed audio data to be decoded may be a bitstream of the AAC-LC (Low Complexity) profile, referred to below simply as AAC-ADTS (Audio Data Transport Stream) format, in which a header including information, such as a synchronous code or a frame length, is annexed to each frame composed of compressed audio data, in turn composed of plural elements. If an error has occurred during the decoding operation, data for interpolation is generated by an output data interpolation circuit and applied for regulating the bitstream decoding operation. This is described, for example mainly in paragraphs 0068 to 0083 and FIGS. 2 and 4 of Japanese patent laid-open publication No. 2002-335230.

There is also known a technique which includes the power information as side information of the MP3 system bitstream having a header on a frame basis, and adjusts the sound volume from one music piece to another on the basis of the power information in order to dispense with adjustment of the sound volume at the time of continuous playback. It is stated that this technique may be applied to a bitstream of the ADIF (Audio Data Interchange Format) format of MPEG/AAC in which there is only one header at the beginning of a data file. This is described, for example mainly on page 6, paragraphs 0037 to 0045 and FIGS. 1 and 3 of U.S. patent application publication No. US 2005/0147004 A1 to Kumagai, et al.

In the techniques of the aforementioned patent publications, it is a bitstream of a data file of the AAC-ADTS format or the MP3 format that is decoded. In the bitstream of a data file of the AAC-ADTS format or the MP3 format, a header is appended to each frame. Hence, if an operator, such as a user of a portable audio player, instructs a fast feed operation by way of a seek operation in which part of a piece of music under playback corresponding to a predetermined period of time, such as five seconds, is skipped from the position being reproduced to reproduce the piece of music recorded in the forward position, then a jump is made to a forward frame ahead by the predetermined period of time, and a header of the next frame following the forward frame is detected to re- initiate the decoding to reproduce the music of the next frame. If the operator instructs a rewind operation by way of a seek operation in which reversion is made from the position being reproduced by the predetermined period of time to reproduce again the already reproduced part of the music piece, then a jump is made to a backward frame by one frame in rear corresponding to the predetermined period of time before, and a header of the next frame following the frame reached by the backward jump is detected to re-initiate the decoding to reproduce the music from before the predetermined period of time.

However, if a bitstream of a data file of data encoded in accordance with a file format such as ADIF format of the MPEG2/AAC-LC profile, referred to be low as AAC-ADIF format, in which the bitstream in the file format including plural frames connected to a sole header is decoded as stated in the publication No. 2005/0147004, then there is only one header in each data file. Hence, it is not possible to detect a header appended to each frame, so that the aforementioned seek operation cannot be made.

SUMMARY OF THE INVENTION

It is an object of the present invention to provide a decoder for implementing a seek operation in case of decoding a bitstream recorded in accordance with a file format in which a plural number of frames are connected to a sole header.

In accordance with the present invention, there is provided a decoder including a memory for storage of jump time at the time of a seek operation, a first reader for reading out a data file including a header and a plurality of frames having recorded data compressed by encoding, and a recognizer for recognizing the frames from the data file read out. A first provider affords frame numbers to the frames sequentially from an initial frame, a memory saver saves the frame number of a frame being read out as a current frame number in the memory, and an input unit receives a command input for a seek operation. A second reader reads out the jump time and the current frame number from the memory when the command input for a seek operation is received, and a calculator calculates the frame number of jump destination on the basis of the jump time and the current frame number read out and for saving the frame number of jump destination. A second provider affords provisional frame numbers to the frames from an initial frame upon reception of the command input for a seek operation, while the recognizer are recognizing the frames. A first decoder reads out the frame number of jump destination saved, selecting a frame from which decoding is to be initiated on the basis of the frame number of jump destination and the provisional frame number, and for decoding the compressed data from the frames on the frame basis, in case the command input for the seek operation received is for fast feed. A second decoder reads out the frame number of jump destination saved, selecting the frame from which decoding is to be initiated on the basis of the frame number of jump destination and the provisional frame number, and for decoding the compressed data from the frames on the frame basis, in case the command input for the seek operation received is for rewind.

According to the present invention, in case a fast feed operation is to be made, the operation of reproduction may be sequentially re-initiated from, for example the next frame following a frame of the frame number of jump destination, whereas, in case a rewind operation is to be made, the operation of reproduction may be sequentially re-initiated from the frame of the frame number of the jump destination. Hence, the seek operation may be implemented with advantage even in case of decoding a data file of data recorded in accordance with a filing format in which a plural number of frames are connected to a sole header.

BRIEF DESCRIPTION OF THE DRAWINGS

The objects and features of the present invention will become more apparent from consideration of the following detailed description taken in conjunction with the accompanying drawings in which.

DESCRIPTION OF THE PREFERRED EMBODIMENTS

Figure 1:
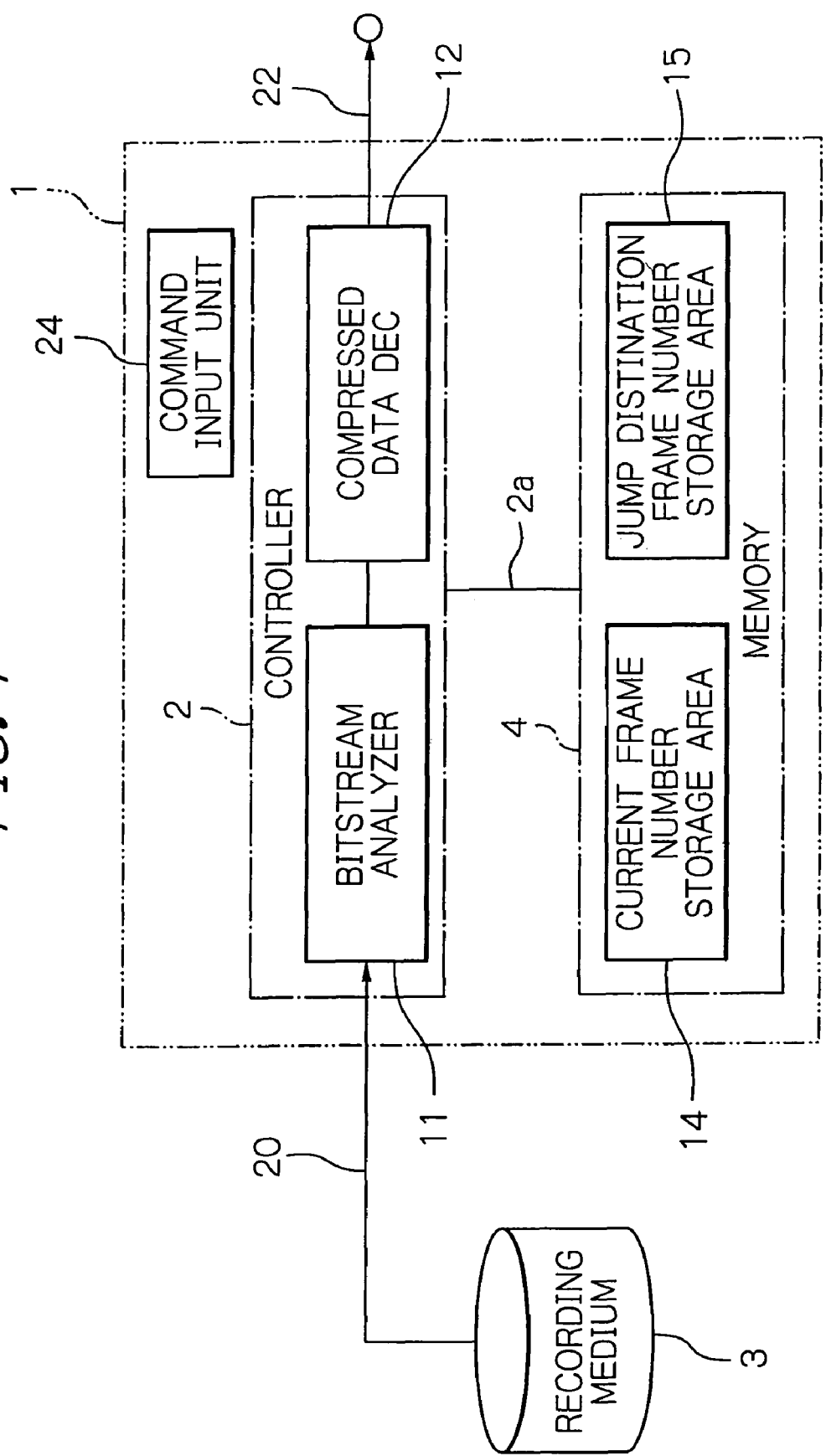
FIG. 1 is a schematic block diagram showing an illustrative embodiment of a decoder according to the present invention.

Preferred embodiments of the present invention will now be described with reference to the accompanying drawings. Referring to FIG. 1, a decoder 1 is implemented by a microcomputer, for example. The decoder 1 includes a controller 2, which corresponds to, e.g. a microprocessor of the microcomputer, and has the function of controlling the constituent components of the decoder 1 to carry out the processing for decoding of the present embodiment. The processing for decoding may include decoding compressed audio data 20 recorded in a compressed form on a recording medium 3, such as a semiconductor memory card or a hard disk, by the encoding of the AAC-ADIF (Advanced Audio Coding-Audio Data Interchange Format) format, into PCM (Pulse Code Modulation) data 22, which is then output. The decoder 1 includes a command input unit 24 which is adapted to receive an instruction on a seek operation by an operator. In the following, signals or data are designated with reference numerals of connections on which they are conveyed.

Figure 2:
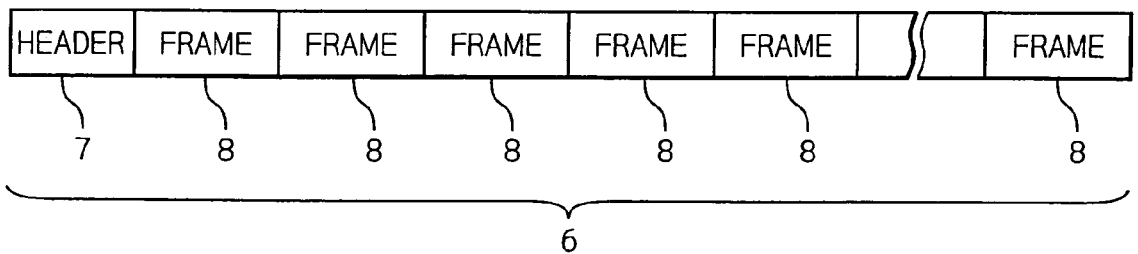
FIG. 2 schematically shows the configuration of a data file of the embodiment shown in FIG. 1.

The decoder 1 includes a memory 4, which may, for example, be a RAM (Random Access Memory) or a ROM (Read-Only Memory) of the microcomputer. The memory 4 is adapted for storing therein program sequences as run by the controller 2, various sorts of information used therefor, and the results from processing by the controller 2, only by way of examples. FIG. 2 shows a data file 6 encoded in accordance with an AAC-ADIF format is made up of a header 7 and a plural number of frames 8 connected to one another and ultimately to the header 7. In the header 7, there is recorded the file information, exemplified by a file length or a file identifier, such as a data file number, for specifying audio data, e.g. music data, recorded therein.

In the present embodiment, one data file 6 is formed for each audio data. In each frame 8, there is recorded a unit of encoded, i.e. compressed, audio data. Each unit of compressed audio data is part of PCM data as digitized audio data, and has the duration of a unit time in reproducing the audio data, termed a unit time of reproduction corresponding to, such as 1,024 samples.

In the memory 4, there is stored a decoding program of the present embodiment from the outset. The decoding program includes an application program sequence run by a bitstream analyzer 11 of the controller 2, and an application program sequence run by a compressed data decoder 12. The decoding program also includes an application program sequence having the function of performing a seek operation, such as fast feed or rewind, in which there is made a jump of a predetermined period of time, termed a jump time, of five seconds, for example, when the operator performs a seek operation. The functions of the hardware of the decoder 1 of the instant embodiment are implemented by the procedure steps of the decoding program executed by the controller 2.

The bitstream analyzer 11 is an application program having an analyzing function and a dummy analyzing function. The analyzing function reads out, bit by bit, a bitstream of the data file 6 recorded on the recording medium 3, recognizes a frame 8 when a complete unit of compressed audio data has been read out, and sends out a plural number of the recognized frames in a lump to the compressed data decoder 12 from frame to frame. The dummy analyzing function reads out the bitstream bit by bit during the seek operation to recognize one frame 8, and accords a provisional frame number to each of the recognized frames 8 without sending out the recognized frames to the compressed data decoder 12.

The compressed data decoder 12 is an application program for decoding the compressed audio data of the frame 8 received from the bitstream analyzer 11 into PCM data of the reproduction unit time, and for consecutively outputting the PCM data decoded from one frame 8. In the memory 4, there are stored data of the jump time for the seek operation, and the reproduction unit time. In the memory 4, there are secured a current frame number storage area 14 and a jump destination frame number storage area 15. In the current frame number storage area 14, the current frame number of a frame being read out by the bitstream analyzer 11 based on the analyzing function thereof is to be stored. In the jump destination frame number storage area 15, the frame number of the jump destination to which jump is to be made during the seek operation is to be stored. The current frame number and the frame number of the jump destination are input and output over a line 2a.

Figure 3A:
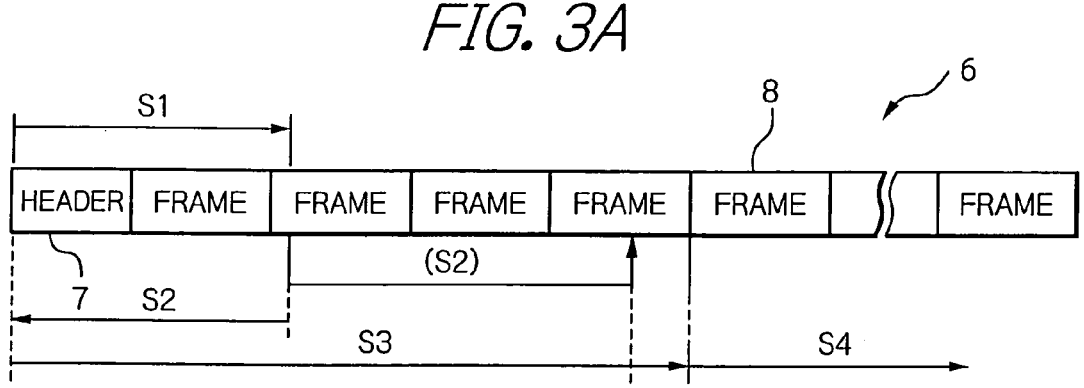
FIGS. 3A and 3B diagrammatically show how a seek operation proceeds in the illustrative embodiment.

The fast feed operation for the seek operation in the decoding operation of the instant embodiment will now be described step-by-step with reference to FIG. 3A. In case a decoding program is booted, in a step S1 the controller 2 enters the stand-by state to wait for file selection which is to be initiated by the depression of a file selection button, such as music select button, not shown. The stand-by state is sustained in case the file selection button is not depressed. When the file selection button is depressed, the controller 2 recognizes the file identifier, such as file number as selected, searches the header 7 of the data file 6 recorded on the recording medium 3 on the basis of the file identifier, and specifies the relevant data file 6 to read out a bitstream 20 of the data file 6.

The bitstream analyzer 11 of the controller 20 then performs analysis in order to read out the bitstream bit-by-bit. The bitstream analyzer performs the operation of recognizing the frame 8 by detecting the trailing end of the frame 8 when all bits of the unit of compressed audio data have been readout. The sequential frame number accorded to each frame 8, and beginning from the initial frame 8 is accorded to the recognized frame 8 when the leading bit of a frame 8 in question has been read out. The leading bit of the frame 8 in question means the leading bit following the header 7 in case the frame 8 in question is the initial frame following the header 7, and means the leading bit following the trailing end of the frame 8 immediately before the recognized frame 8. The data on the frame number are stored in the current frame number storage area 14 of the memory 4 by overwrite as the current frame number by way of updating the current frame number.

In parallel therewith, the controller 2 sends one unit of compressed audio data of the one frame 8 readout from the bitstream 20 to the compressed data decoder 12. The controller 2 decodes the unit of compressed audio data of the frame 8 into PCM data by the compressed data decoder 12, and outputs the decoded PCM data of the reproduction unit time to, e.g. a digital-to-analog (DA) converter, not shown.

The above-described sequence of operations is carried out repeatedly to execute the operation of reproduction of the present illustrative embodiment. If in the course of the operation of reproduction the operator depresses a fast feed button or a rewind button, not shown, as in a step S2 to carry out selective instruction of a seek operation, the controller 2 which has accepted the selective instruction from the operator discontinues the operation of reproduction of the analyzer 11 and makes the bitstream analyzer 11 perform the processing of dummy analysis. In the present case, the selective instruction is of fast feed. The controller 2 reads out, from the memory 4, data on the jump time and the unit time of reproduction stored therein, and the current frame number stored in the current frame number storage area 14. The controller 2 calculates the frame number of the jump destination on the basis of the read out current frame number and jump time.

More specifically, since the fast feed has been selected in the present case, the controller 2 divides the jump time as read out, by the unit reproduction time, and rounds off a fractional number to give an integer which stands for the number of the frames 8 that will occur during the jump time. The controller 2 sums the obtained number of the frames 8 to the current frame number to calculate the frame number of the jump destination. The controller 2 stores the calculated frame number of the jump destination by overwriting in the jump destination frame number storage area 15 of the memory 4. The bitstream readout position is restored to the header 7 of the data file 6 being analyzed, in order to jump to the frame 8 of the jump destination to re-initiate the operation of reproduction from the frame following the frame of the jump destination as indicated in a step (S2).

In a step S3, the controller 2 which has returned the bitstream readout position to the header 7 reads out the frame number of the jump destination stored in the jump destination frame number storage area 15. As the operation of recognizing the frame 8 is continued in the same way as in the above step S1, the controller 2 accords a provisional frame number to each frame 8 from the initial frame 8 in turn, and compares the provisional frame number to the frame number of the jump destination. In case the result of comparison indicates that the frame number of the jump destination coincides with the provisional frame number, and the trailing end of the frame 8 being read out is detected, the operation of dummy analysis is finished.

The controller 2 makes the bitstream analyzer 11 switch from the processing of the dummy analysis to the analysis process, and initiates the operation of reproduction from the frame 8 following the frame number of the jump destination, in the same way as in step S1 above.

Figure 3B:
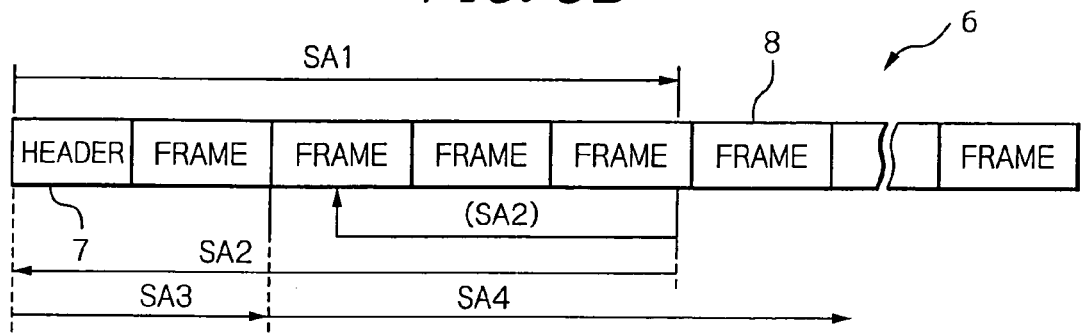

The rewind operation of the seek in the decoding of the instant embodiment will now be described in accordance with steps shown in FIG. 3B. In a step SA1, the controller 2 executes the operation of reproduction in the same way as in the step S1 above. In a step SA2, if selective instruction for rewind is made in the course of the operation for reproduction in the step S2 above, the controller 2 which has accepted this selective instruction interrupts the operation of the bitstream analyzer 11 for reproduction, and makes the bitstream analyzer 11 perform the processing of the dummy analysis. Thus, the controller 2 reads out the jump time, the unit time of reproduction and the current frame number from the memory 4, and calculates the frame number of the jump destination on the basis of the read out current frame number and the jump time.

Specifically, since the rewind has been selected in the present case, the controller 2 divides the jump time as read out by the unit time of reproduction, and rounds off the fraction to yield an integer to find the number of the frames included within the jump time. The controller 2 then subtracts the calculated number of frames 8 from the current frame number to calculate the frame number of the jump destination. The controller 2 stores the calculated frame number of the jump destination by overwriting in the jump destination frame number storage area 15 of the memory 4. The bitstream readout position is restored to the header 7 of the data file 6 being analyzed, in order to jump to the frame 8 of the jump destination indicated by a step SA2, FIG. 3B, and in order to re-initiate the operation of reproduction from the frame 8 of the jump destination.

In a step SA3, the controller 2 which has returned the bitstream readout position to the header 7 reads out the frame number of the jump destination as in the step S3 above. As the operation of recognizing the frame 8 from the header 7 is continued in the same way as in the above step S1, the controller 2 accords a provisional frame number to each frame 8 from the initial frame 8 in turn, and compares the provisional frame number to the frame number of the jump destination. In case the result of comparison indicates that the frame number before the frame number of the jump destination by one coincides with the provisional frame number, and the trailing end of the frame 8 being read out is detected, the operation of dummy analysis comes to a close.

In a step SA4, the controller 2 makes the bitstream analyzer 11 switch from the processing of the dummy analysis to the analysis process, and re-initiates the operation of reproduction from the frame 8 of the frame number following the frame number by one before the frame number of the jump destination, that is, from the frame 8 of the frame number of jump destination, in the same way as in step S1 above. If seeking is subsequently carried out again, the controller 2 performs the seek in the same way as above. In case the file length as entered in the header 7 is reached during the operation of reproduction, the operation of reproduction is discontinued, and the stand-by state is set in readiness for the file selection as described above.

A sequence of decoding operations inclusive of the seek operation of the present embodiment is carried out as described above. In the seek operation of the present embodiment described above, the frame number of the jump destination calculated on the basis of the current frame number and the jump time is saved when the selective instruction of the seek operation is accepted. Reversion is transiently made to the header 7 of the data file 6 being analyzed, and merely a provisional frame number is accorded to the compressed audio data as read out by way of performing the processing of dummy analysis without the compressed audio data as read out being sent to the compressed data decoder 12. For the fast feed operation, the processing of dummy analysis is finished when the provisional frame number coincides with the frame number of the jump destination and the trailing end of the frame 8 being read out is detected. The operation of reproduction is re-initiated sequentially from the frame following the frame number of jump destination. For the rewind operation, when the provisional frame number is coincident with the frame number by one before the frame number of the jump destination, and the trailing end of the frame 8 being read out is detected, the processing of dummy analysis is finished, and the operation of reproduction is re-initiated from the frame 8 of the frame number of the jump destination. Hence, the seek operation may be carried out even in case of decoding the data file 6 recorded in the file format of the AAC-ADIF format. Further, since the decoding by the compressed data decoder 12 is not carried out but the processing of dummy analysis is carried out, a high-speed seek operation may be achieved.

Figure 4:
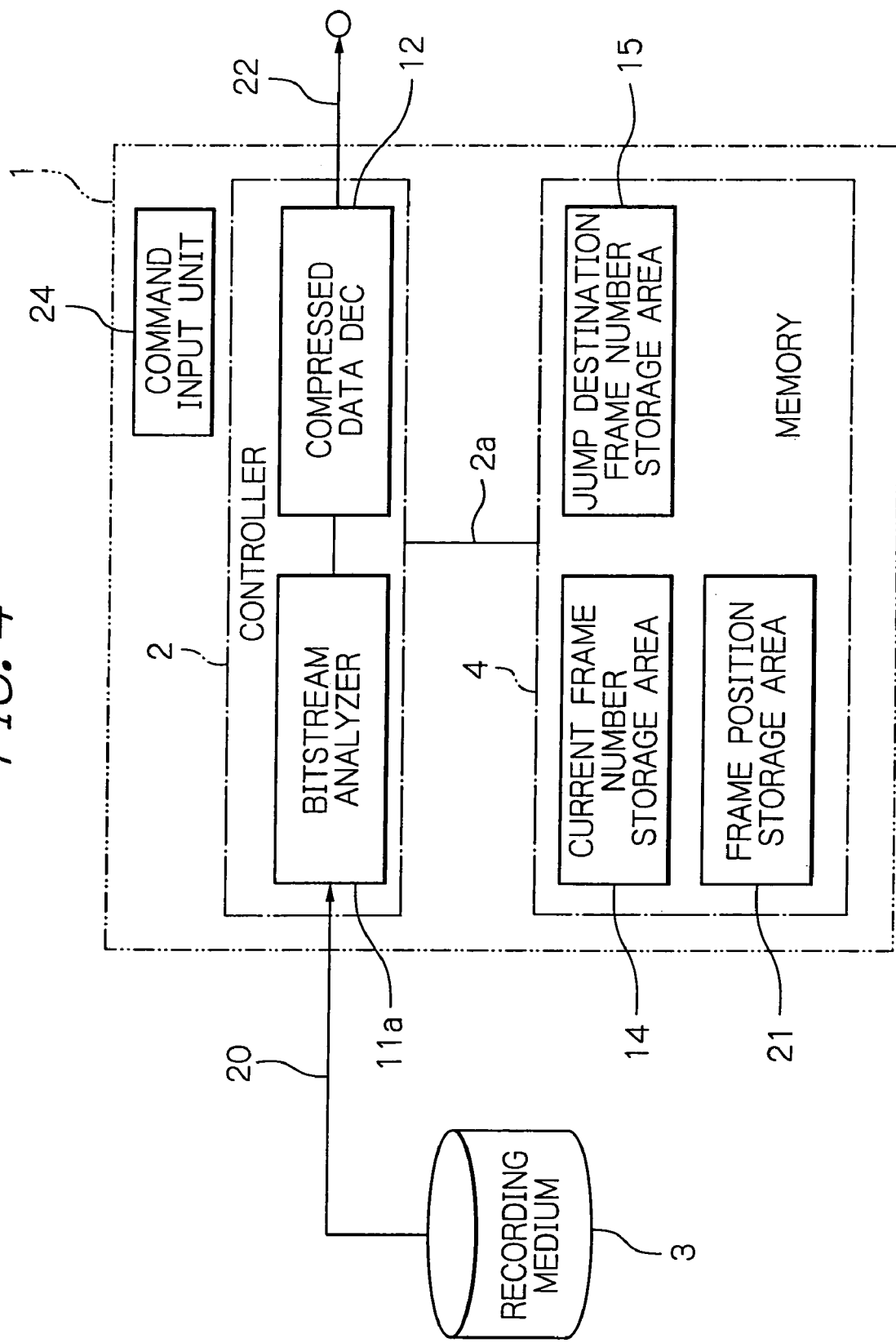
FIG. 4 is a schematic block diagram, like FIG. 1, showing an alternative embodiment of a decoder according to the present invention.

FIG. 4 is a schematic block diagram showing an alternative embodiment of a decoder according to the present invention. The parts or components similar to those of the embodiment shown in FIG. 1 are denoted by the corresponding reference numerals and the description is dispensed with. In the memory 4 of the present alternative embodiment, the jump time and the unit time of reproduction are stored as in the embodiment shown in and with reference to FIG. 1. In addition, there are secured in the memory 4 the current frame number storage area 14 and the jump destination frame number storage area 15, similar to those of the embodiment shown in FIG. 1. There are also secured in the memory 4 a frame position storage area 21 for storing the leading position of each frame 8 in association with the corresponding frame number.

The instant alternative embodiment has a bit stream analyzer 11a which is an application program similar to the bitstream analyzer 11 of the embodiment shown in FIG. 1, except having certain functions in addition to the functions of the bitstream analyzer 11 of the embodiment shown in FIG. 1. Specifically, the bitstream analyzer 11a of the instant alternative embodiment has the function similar to the bitstream analyzing function of the embodiment shown in FIG. 1 plus the function of storing the leading position of the frame 8 recognized during the time of carrying out the bitstream analyzing function, in the frame position storage area 21 in association with the frame number. The bitstream analyzer 11a also has the function of carrying out a seek operation based on the leading position.

In the memory 4 of the instant alternative embodiment, there is stored in advance a decoding program composed of an application program sequence for operating the bitstream analyzer 11a, an application program sequence having the function of carrying out a seek operation, and an application program sequence executed as the compressed data decoder 12 in the same way as in the illustrative embodiment shown in FIG. 1. The functions of the hardware of the decoder 1 of the instant alternative embodiment are implemented by the steps of the decoding program as run by the controller 2.

Figure 5A:
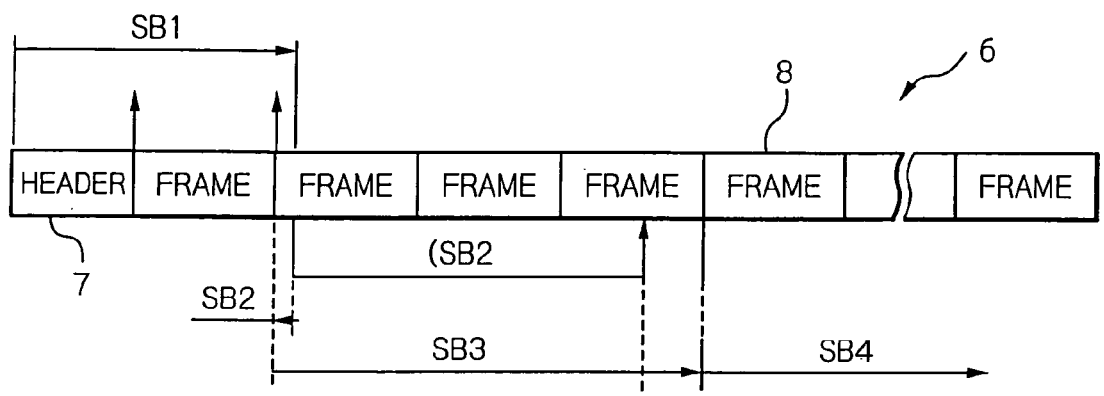
FIGS. 5A and 5B diagrammatically show how a seek operation proceed in the alternative embodiment.

The fast feed operation for the seek operation of the decoding of the alternative embodiment will now be described in accordance with steps shown in FIG. 5A. In case the decoding program is booted in a step SB1, the controller 2 carries out the operation of reproduction in the same way as in the step S1 of the embodiment shown in FIG. 1. In this case, the controller 2 updates the current frame number in the current frame number storage area 14 of the memory 4 by overwriting the current frame number of a frame 8 in question. When the controller has read out the leading bit of the frame 8 in question, the controller 2 recognizes the location of the bit which is the leading position address of the frame 8 of the recording medium 3. The controller causes the leading bit to be stored as representing the leading location in the frame position storage area 21 in the memory 4. It is noted that the leading bit of the frame 8 in question is the leading bit following the header 7, in case the frame 8 is the initial frame following the header 7, and that, in case the frame 8 in question is a frame different from the initial frame following the header 7, the leading bit of the frame 8 is the leading bit following the trailing end of the frame 8 before the recognized frame by one.

In a step SB2, if selective instruction of fast feed is carried out during the operation of reproduction in the same way as in the step S2 of the embodiment shown in FIG. 1, the controller 2 which has accepted this selective instruction calculates the frame number of the jump destination in the same way as in the step S2 of the embodiment shown in FIG. 1. The controller 2 causes the calculated frame number of the jump destination to be stored by overwrite in the jump destination frame number storage area 15 of the memory 4. The controller 2 also searches the frame position storage area 21 of the memory 4 on the basis of the current frame number as read out as described above, and extracts the leading position of the relevant frame number in order to jump to the frame 8 of jump destination as indicated in a step (SB2) of FIG. 5A and in order to re-initiate the operation of reproduction from a frame 8 following the frame 8 of jump destination. The controller 2 then returns the bitstream readout position to the extracted leading position, which is the leading position of the frame 8 having the current frame number in the present case.

In a step SB3, the controller 2 reads out the frame number of the jump destination saved in the jump destination frame number storage area 15. The controller 2 then switches from processing by the bitstream analyzer 11a to the processing of dummy analysis, and carries out the operation of recognizing the frames 8 from the leading position of the current frame 8 as in the step S1 of the embodiment shown in FIG. 1. The controller 2 accords provisional frame numbers to the frames, as it increases by one, or increments, the provisional frame number from the current frame number one. The controller 2 causes the leading positions of the frames 8 to be stored in the frame position storage area 21 so that the leading positions of the frames 8 thus stored correspond to the provisional frame numbers. The controller 2 compares the provisional frame number to the frame number of the jump destination. In case the result of the comparison indicates that the frame number of jump destination is coincident with the provisional frame number, and the trailing end of the frame 8 being read out is detected, the processing of dummy analysis comes to a close.

In a step SB4, the controller 2 makes the bitstream analyzer 11a switch to the processing by analysis, and sequentially initiates again the processing of reproduction from the frame 8 following the frame number of the jump destination as in the step S1 of the illustrative embodiment shown in FIG. 1.

Figure 5B:
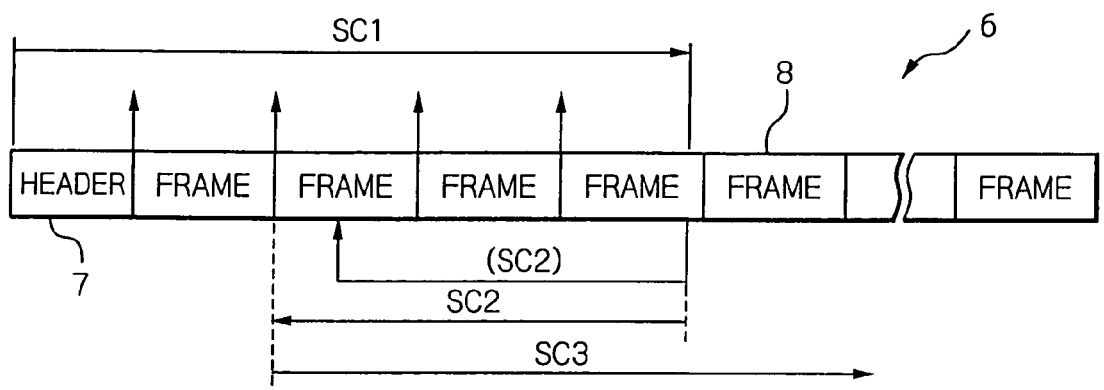

The rewind operation of the seek operation of decoding of the alternative embodiment will now be described in accordance with the steps SC, FIG. 5B. The controller 2 executes the operation of reproduction in the same way as in the step SB1 (step SC1). During the operation of reproduction, if the selective instruction for rewind is made as in the step S2 of the embodiment shown in FIG. 1, the controller 2 which has accepted the selective instruction calculates the frame number of the jump destination as in the step SA2 of the embodiment shown in FIG. 1 (step SC2). The controller 2 causes the calculated frame number of the jump destination to be stored by overwrite in the jump destination frame number storage area 15 of the memory 4. Also, in order to jump to the frame of the jump destination shown in a step (SC2) in FIG. 5B to re-initiate the operation of reproduction from this frame 8, the controller 2 reads out the frame number of the jump destination stored in the jump destination frame number storage area 15. The controller 2 searches the frame position storage area 21 of the memory 4 on the basis of the read out frame number of the jump destination to extract the leading position of the frame number. The controller 2 then returns the bitstream readout position to the extracted leading position, which is the leading position of the frame 8 having the frame number of the jump destination in the present case.

In a step SC3, the controller 2 makes the bitstream analyzer 11a switch to the analysis process to start againg the operation of reproduction sequentially from the leading position of the frame 8 of the frame number of the jump destination to which the bitstream readout position has reverted, in the same way as in the step S1 of the embodiment shown in FIG. 1.

If the seek operation is carried out again subsequently, the controller 2 carries out the seek operation as described above. In case the operation of reproduction has reached the file length entered in the header 7, the operation of reproduction is terminated. The controller 2 erases the data stored in the frame position storage area 21 of the memory 4 and enters the stand-by state to wait for file selection as described above (step SC3).

A sequence of decoding operations inclusive of the seek operation of the instant alternative embodiment was carried out as described above. In the seek operation of the alternative embodiment, the leading position of each frame is stored in the frame position storage area 21 at the time of the operation for reproduction. In case the selective instruction of the seek operation is accepted and the selective instruction is that of the fast feed operation, the frame of the jump destination calculated on the basis of the current frame number and the jump time is saved. Then, search is made in the frame position storage area 21 on the basis of the current frame number to extract the leading position of the current frame number. The controller then reverts to the leading position of the current frame number to accord only the provisional frame number to the current frame by way of carrying out the processing of dummy analysis without transmitting the compressed audio data as read out to the compressed data decoder 12. In case the provisional frame number coincides with the frame number of the jump destination and the trailing end of the frame 8 being read out is detected, the processing of dummy analysis is terminated, and the operation of reproduction is sequentially commenced again from the frame following the frame number of the jump destination. In case the selective instruction is of the rewind operation, search is carried out in the frame position storage area 21 on the basis of the current frame number to extract the leading position of the frame number of the jump destination to re-start the operation of reproduction from the extracted leading position. Hence, a seek operation may be achieved even in the case of decoding the data file 6 recorded in the file format of the AAC-ADIF format. Further, as the destination of reversion may be specified on the basis of the leading position of each frame 8 stored, at the time of the processing for dummy analysis, to re-initiate the operation of reproduction, it becomes possible to carry out the seek operation more speedily.

The illustrative embodiments are described above in terms of an exemplary case of decoding a data file recorded in a file format of the AAC-ADIF format. However, the favorable results similar to those described above may also be achieved in case the present invention is applied to a data file recorded in accordance with a file system composed of a sole header and a plural number of frames connected to the header, even if the file format is not the AAC-ADIF format. The file format to which the present invention is applicable is not limited to the aforementioned AAC-ADIF format, but may also be one in which a header is provided to each frame, for example the AAC-ADTS (Audio Data Transport Stream) format.

In the above-described embodiments, the compressed data is assumed to be compressed audio data. However, the present invention may similarly be applied to compressed picture or image data obtained through encoding pictures.

The entire disclosure of Japanese patent application No. 2006-103423 filed on Apr. 4, 2006, including the specification, claims, accompanying drawings and abstract of the disclosure, is incorporated herein by reference in its entirety.

While the present invention has been described with reference to the particular illustrative embodiments, it is not to be restricted by the embodiments. It is to be appreciated that those skilled in the art can change or modify the embodiments without departing from the scope and spirit of the present invention.

What is claimed is:

1. A decoder comprising:
a memory for storing jump time at a time of a seek operation;
a first reader for reading out a data file including a header and a plurality of frames having recorded data compressed by encoding;
a recognizer for recognizing the frames from the data file read out;
a first provider for affording frame numbers to the frames sequentially from initial one of the frames;
a memory saver for saving the frame number of a frame being read out as a current frame number in said memory;
an input unit for receiving a command input for a seek operation;
a second reader for reading out the jump time and the current frame number from said memory when the command input for a seek operation is received;
a calculator for calculating the frame number of jump destination on a basis of the jump time and the current frame number read out and for saving the frame number of jump destination;
a second provider for affording provisional frame numbers to the frames from the initial frame upon reception of the command input for a seek operation while said recognizer are recognizing the frames;
a first decoder for reading out the frame number of jump destination saved, selecting a frame from which decoding is to be initiated on the basis of the frame number of jump destination and the provisional frame number, and for decoding the compressed data from the frames on the frame basis, in case the command input for the seek operation received is for fast feed; and
a second decoder for reading out the frame number of jump destination saved, selecting the frame from which decoding is to be initiated on the basis of the frame number of jump destination and the provisional frame number, and for decoding the compressed data from the frames on the frame basis, in case the command input for the seek operation received is for rewind.

2. The decoder in accordance with claim 1 wherein the compressed data is compressed audio data.

3. The decoder in accordance with claim 1 wherein the data file is encoded in accordance with an AAC-ADIF (Advanced Audio Coding-Audio Data Interchange Format) format.

4. A decoder comprising:
a memory for storing jump time at a time of a seek operation;
a first reader for reading out a data file including a header and a plurality of frames having recorded data compressed by encoding;
a recognizer for recognizing frames from the data file read out;

a first provider for affording frame numbers to the frames sequentially from initial one of the frames;
a memory saver for saving the frame number of a frame being read out as a current frame number in said memory;
an input unit for receiving a command input for a seek operation;
a second reader for reading out the jump time and the current frame number from said memory when the command input for a seek operation is received;
a calculator for calculating the frame number of jump destination on a basis of the jump time and the current frame number read out and for saving the frame number of jump destination;
a second provider for reverting to the header upon reception of the command input for the seek operation, and for sequentially affording provisional frame numbers to the frames from the initial frame while said recognizer are recognizing the frames;
a first decoder for reading out the frame number of the jump destination saved, and for decoding the compressed data on the frame basis from a frame following the frame the provisional frame number of which coincides with the frame number of the jump destination, in case the command input received is a fast feed operation; and
a second decoder for reading out the frame number of the jump destination saved, and for decoding the compressed data on the frame basis from a frame following the frame the provisional frame number of which coincides with a frame number before the frame number of the jump destination by one, in case the command input received is a rewind operation.

5. A decoder comprising:
a memory for storing jump time at a time of a seek operation;
a first reader for reading out a data file including a header and a plurality of frames having recorded data compressed by encoding;
a recognizer for recognizing the frames from the data file read out;
a first provider for affording frame numbers to the frames sequentially from initial one of the frames;
a first memory saver for storing a leading position of each of the frames in said memory in connection with the frame number of the frame;
a second memory saver for saving the frame number of a frame being read out as a current frame number in said memory;
an input unit for receiving a command input for a seek operation;
a second reader for reading out the jump time and the current frame number from said memory when the command input for a seek operation is received;
a calculator for calculating the frame number of jump destination on a basis of the jump time and the current frame number read out and for saving the frame number of jump destination;
a first extractor for reading out the frame number of the jump destination, and for extracting the leading position of the current frame number from said memory on the basis of the current frame number read out, in case the command input for the seek operation received is a fast feed operation;
a second provider for reverting to the leading position extracted and for sequentially affording provisional frame numbers to the frames while said recognizer are recognizing the frames;
a first decoder for selecting the frame from which decoding is to be initiated, on the basis of the frame number of the jump destination and the provisional frame number, and for decoding the compressed data from the frame on the frame basis;
a second extractor for reading out the frame number of the jump destination, and for extracting the leading position of the frame number from said memory on the basis of the frame number of the jump destination, in case the command input for the seek operation received is a rewind operation; and
a second decoder for reverting to the leading position extracted and for decoding the compressed data from the frames on the frame basis.

6. A decoder comprising:
a memory for storing jump time at a time of a seek operation;
a first reader for reading out a data file including a header and a plurality of frames having recorded data compressed by encoding;
a recognizer for recognizing the frames from the data file read out;
a first provider for affording frame numbers to the frames sequentially from initial one of the frames;
a first memory saver for storing a leading position of each of the frames in said memory in connection with the frame number of the frame;
a second memory saver for saving the frame number of a frame being read out as a current frame number in said memory;
an input unit for receiving a command input for a seek operation;
a second reader for reading out the jump time and the current frame number from said memory when the command input for a seek operation is received;
a calculator for calculating the frame number of jump destination on a basis of the jump time and the current frame number read out and for saving the frame number of jump destination;
a first extractor for reading out the frame number of the jump destination, and for extracting the leading position of the current frame number from said memory on the basis of the current frame number read out, in case the command input for the seek operation received is a fast feed operation;
a second provider for reverting to the leading position extracted and for sequentially affording provisional frame numbers to the frames while said recognizer are recognizing the frames;
a first decoder for decoding the compressed data on the frame basis from a frame following the frame the provisional frame number of which coincides with the frame number of the jump destination;
a second extractor for reading out the frame number of jump destination saved and for extracting the leading position of the relevant frame number from said memory on the basis of the frame number of jump destination read out, in case the command input for the seek operation received is a rewind operation; and
a second decoder for reverting to the leading position extracted and for decoding the compressed data on the frame basis.

* * * * *